United States Patent
Lu et al.

(10) Patent No.: US 10,251,204 B2
(45) Date of Patent: Apr. 2, 2019

(54) METHOD FOR QUICK CONFIGURATION OF WI-FI CONNECTION OF OUTPUT DEVICE

(71) Applicants: XYZPRINTING, INC., New Taipei (TW); KINPO ELECTRONICS, INC., New Taipei (TW)

(72) Inventors: Tzu-Yang Lu, New Taipei (TW); Kwan Ho, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 38 days.

(21) Appl. No.: 15/621,399

(22) Filed: Jun. 13, 2017

(65) Prior Publication Data

US 2018/0263065 A1 Sep. 13, 2018

(30) Foreign Application Priority Data

Mar. 10, 2017 (CN) .......................... 2017 1 0142046

(51) Int. Cl.
| | |
|---|---|
| *H04W 76/10* | (2018.01) |
| *H04W 48/20* | (2009.01) |
| *H04W 72/08* | (2009.01) |
| *H04L 29/08* | (2006.01) |
| *H04W 48/16* | (2009.01) |
| *H04W 84/12* | (2009.01) |

(52) U.S. Cl.
CPC ........... *H04W 76/10* (2018.02); *H04W 48/20* (2013.01); *H04L 67/1046* (2013.01); *H04W 48/16* (2013.01); *H04W 72/085* (2013.01); *H04W 84/12* (2013.01)

(58) Field of Classification Search
CPC .............................. H04W 76/10; H04W 48/20
See application file for complete search history.

(56) References Cited

U.S. PATENT DOCUMENTS

| | | | | |
|---|---|---|---|---|
| 2012/0044862 A1* | 2/2012 | Chen | ............................. | 370/328 |
| 2012/0054493 A1* | 3/2012 | Bradley | ........................ | 711/171 |
| 2013/0077564 A1* | 3/2013 | Tiwari | ........................... | 370/328 |

* cited by examiner

*Primary Examiner* — Ronald B Abelson
(74) *Attorney, Agent, or Firm* — Chun-Ming Shih; HDLS IPR Services

(57) ABSTRACT

A method for quick configuration of Wi-Fi connection of output device is provided. The method includes following steps of: retrieving a plurality of access point data respectively corresponding to a plurality of Wi-Fi access points based on Wi-Fi protocol at a computer device; selecting one of the plurality of the access point data for generating a corresponded configuration data; establishing a heterogeneous connection with an output device based on a heterogeneous protocol; transferring the configuration data to the output device via the heterogeneous connection; and, establishing a Wi-Fi connection with the corresponded Wi-Fi access point based on Wi-Fi protocol according to the received configuration data at the output device. Therefore, the output device can be effectively connected to the designated Wi-Fi access point, the configuration of Wi-Fi connection can be simplified, and the configuration time can be reduced.

8 Claims, 5 Drawing Sheets

METHOD FOR QUICK CONFIGURATION OF WI-FI CONNECTION OF OUTPUT DEVICE

BACKGROUND OF THE INVENTION

Field of the Invention

The technical field relates to method for Wi-Fi connection and more particularly related to method for configuration of Wi-Fi connection of output device.

Description of Related Art

Currently, various output devices having ability of connecting to the Internet had been disclosed. More specifically, above-mentioned output device may be wirelessly connected to a Wi-Fi access point (AP) based on a Wi-Fi protocol, and transfer data with the other wireless devices via the connected Wi-Fi access point.

In general, for reducing the cost of manufacture and the volume of device, the output device usually doesn't arrange a human-machine interface (such as keyboard and display) or arranges an extremely simplified human-machine interface (such as simple function keys or mini display), such that the user cannot make the output device be configured to connect to the Wi-Fi access point via operating the output device directly.

For solving above-mentioned problem, a method for configuration of Wi-Fi connection of output device had been provided, the method is to use a computer device arranged a full function human-machine interface. Please refer to FIG. 1, which is a sequence diagram of a method for configuration of Wi-Fi connection of output device according to the related art.

When the user wants to configure the Wi-Fi connection of an output device 12, the user must make a computer device 10 wired connect to the output device 12. Then, the user may operate the computer device 110 to send a scan command to the output device 12 (step S100).

After receiving the scan command, the output device 12 scans the Wi-Fi signals based on a Wi-Fi protocol (step S102). During scan, a first Wi-Fi access point 14 and a second Wi-Fi access point 16 may respectively broadcast their Service Set ID (SSID) based on the Wi-Fi protocol continually. Thus, the output device 12 may receive a first SSID from the first Wi-Fi access point 14 (step S1020), and receive a second SSID from the second Wi-Fi access point 16 (step S1022). After completing scan, the output device 12 returns a scan result (the scan result comprises the plurality of the received SSIDs) to the computer device 10 (step S104).

Then, the user operates the computer device 10 to select one of the first SSID and second SSID (step S106), and sends a corresponded connection command to the output device 12 (step S108). Take selecting the first SSID for example in FIG. 1. After receiving the connection command, the output device 12 may establish a Wi-Fi connection with the first Wi-Fi access point 14 (step S110) according to the received connection command. After the Wi-Fi connection had been established, the output device 12 may wirelessly transfer data with the computer device 10 or the other wireless devices via the first Wi-Fi access point 14.

Although the method for configuration according to the related art has ability of configuring the Wi-Fi connection of the output device 12, however, the method for configuration according to the related art has following disadvantages caused by a Wi-Fi module of the output device 12 usually being arranged a low-capacity memory and never connecting to the user-designated Wi-Fi access point (namely, the Wi-Fi module doesn't store the user-designated SSID).

The user-designated SSID may be excluded from the scan result when number of Wi-Fi access points arranged around the output device 12 is over a capacity of the memory of the Wi-Fi module of the output device 12, such that the user cannot select user-designated SSID according to the scan result and the output device 12 cannot establish the Wi-Fi connection with the user-designated Wi-Fi access point. Besides, the complexity of configuration and the time required to configuration increase because the computer device 10 must transfer data and commands with the output device 12 several times. Furthermore, the output device 12 cannot receive the user-designated SSID and the scan result cannot comprise the user-designated SSID when the user-designated access point is configured to hide its SSID (namely, the user-designated access point will not broadcast the user-designated SSID), such that the user cannot operate the computer device 10 to select user-designated SSID according to the scan result and the output device 12 cannot establish the Wi-Fi connection with the user-designated Wi-Fi access point.

SUMMARY OF THE INVENTION

The present disclosed example is directed to a method for quick configuration of Wi-Fi connection of output device which has ability of retrieving the access point data of the access point which the user wants to connect directly without output device.

One of the disclosed examples, a method for quick configuration of Wi-Fi connection of output device, comprises: a) retrieving a plurality of access point data respectively corresponding to a plurality of Wi-Fi access points based on a Wi-Fi protocol at a computer device; b) selecting one of the plurality of the access point data and generating a corresponded configuration data; c) establishing a heterogeneous connection with an output device based on a heterogeneous protocol, wherein the heterogeneous protocol is different with the Wi-Fi protocol; d) transferring the configuration data to the output device via the heterogeneous connection; and, e) establishing a first Wi-Fi connection with the corresponded Wi-Fi access point based on the Wi-Fi protocol according to the received configuration data at the output device.

In one embodiment, the step a) is configured to scan the plurality of the access point data respectively broadcasted by the plurality of the Wi-Fi access points based on the Wi-Fi protocol.

In one embodiment, the step b) comprises following steps: b1) selecting one of the plurality of the access point data; b2) retrieving a connection password of the selected access point data; and, b3) generating the configuration data according to the selected access point data and the connection password.

In one embodiment, the heterogeneous protocol is USB wire transmission protocol, NFC wireless transmission protocol or Bluetooth wireless transmission protocol.

In one embodiment, each access point data comprises an SSID corresponding to the Wi-Fi access point.

In one embodiment, the step b) comprises: b4) selecting one of the plurality of the access point data; b5) executing a transcoding process to the selected access point data for transforming the access point data from a first coding format into a second point data supported by the output device; and, b6) generating the configuration data according to the transcoded access point data.

In one embodiment, the step a) is configured to load the plurality of the access point data of the plurality of the Wi-Fi access points which the output device had connected previously.

In one embodiment, the step b) is configured to select the access point data of the Wi-Fi access point which the computer device connects currently.

In one embodiment, the step e) comprises following steps of: e1) sending a connection request to the corresponded Wi-Fi access point based on the Wi-Fi protocol according to the received configuration data; e2) receiving a network address from the Wi-Fi access point; and e3) establishing a first Wi-Fi connection with the Wi-Fi access point according to the network address.

In one embodiment, the output device is a 3D printer, the method for quick configuration of Wi-Fi connection of output device comprises following steps of: f1) loading a 3D object data at the computer device; f2) executing a slicing process to the 3D object data for generating a 3D print data; f3) establishing a second Wi-Fi connection with the corresponded Wi-Fi access point based on the Wi-Fi protocol according to the configuration data; f4) transferring the 3D print data to the output device via the second Wi-Fi connection, the corresponded Wi-Fi access point data and the first Wi-Fi connection; and, f5) controlling a 3D print head to print layer by layer for generating a 3D physical model according to the received 3D print data at the output device.

The present disclosed example can effectively make the output device be connected to the designated Wi-Fi access point, simplify the configuration of Wi-Fi connection and reduce the configuration time.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
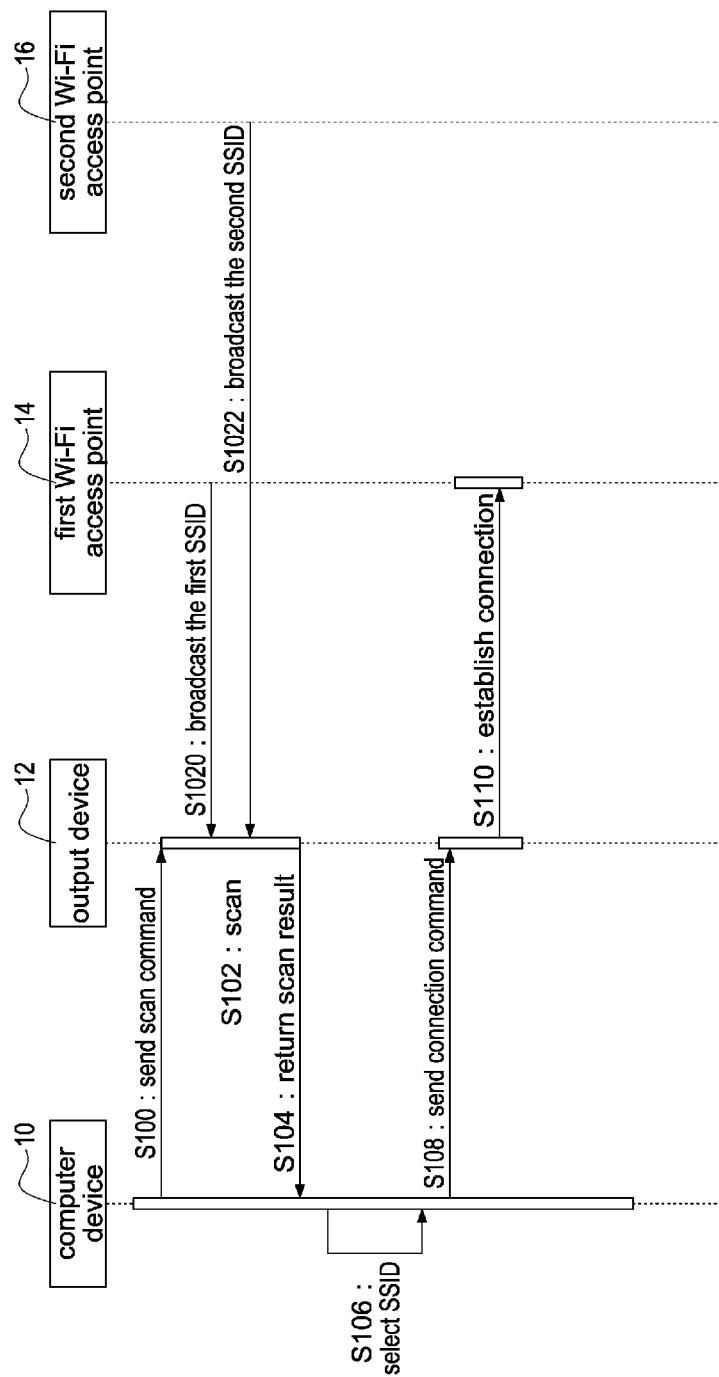
FIG. 1 is a sequence diagram of a method for configuration of Wi-Fi connection of output device according to the related art.
Figure 2:
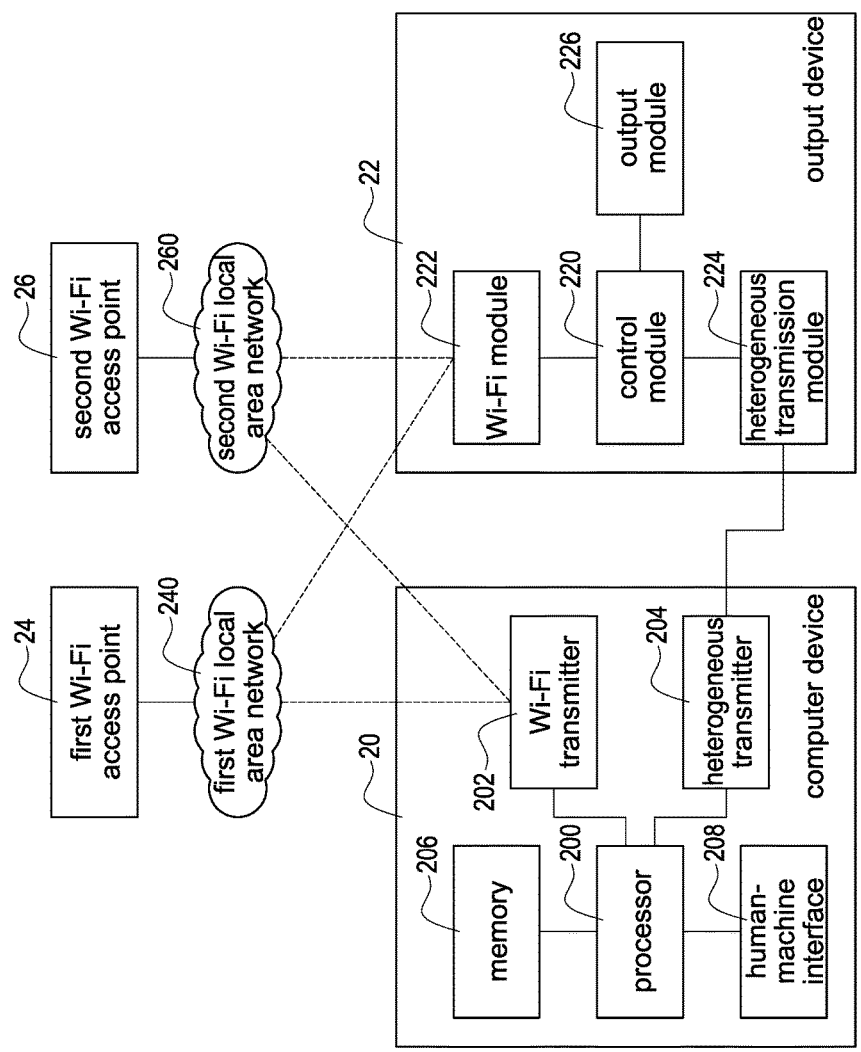
FIG. 2 is an architecture diagram of a network system according to the first embodiment of the present disclosed example.

Please first refer to FIG. 2, which is an architecture diagram of a network system according to the first embodiment of the present disclosed example. As shown in FIG. 2, the network system mainly comprises a computer device 20, an output device 22 and a plurality of Wi-Fi access points. Take two access points (first Wi-Fi access point 24 and second Wi-Fi access point 26) for example in FIG. 2, but this specific example is not intended to limit the number of the access points.

Each access point may respectively establish its Wi-Fi local area network (LAN), such as a first local area network 240 and a second local area network, so as to make the devices connecting to the same Wi-Fi access point have ability of data transmission in the Wi-Fi local area network corresponding to the connected Wi-Fi access point.

The computer device 20 (such as personal computer, tablet, laptop, or smartphone) comprises a Wi-Fi transmitter 202, heterogeneous transmitter 204, memory 206, human-machine interface 208 and processor 200 electrically connected to above-mentioned modules 202-208. The Wi-Fi transmitter 202 is used to connect the designated Wi-Fi access point based on a Wi-Fi protocol and wirelessly transfer data. The heterogeneous transmitter 204 (such as USB transmitter, NFC transmitter or Bluetooth transmitter) is used to wired/wirelessly connect to an external device (such as output device 22) and transfer data based on a heterogeneous protocol (such as USB wire transmission protocol, NFC wireless transmission protocol or Bluetooth wireless transmission protocol) being different with the Wi-Fi protocol. The memory 206 is used to store data. The human-machine interface 208 (such as mouse, keyboard, display, speaker, touchscreen or any combination of above-mentioned human-machine interface) is used to receive a user's operation of inputting data and outputting data. The processor 200 is used to control the computer device 20.

The output device 22 (such as printer, display or TV box) comprises a Wi-Fi module 222, a heterogeneous transmission module 224, an output module 226 and a control module electrically connected to above-mentioned modules 222-226. The Wi-Fi module 222 is used to connect the designated Wi-Fi access point based on the Wi-Fi protocol and wirelessly transfer data. The heterogeneous transmission module 224 is used to connect to the computer device 20 and transfer data based on the heterogeneous protocol (such as USB wire transmission protocol, NFC wireless transmission protocol or Bluetooth wireless transmission protocol) being different with the Wi-Fi protocol. Furthermore, the heterogeneous protocol used by the heterogeneous transmission module 224 of the output device 22 is compatible with the heterogeneous protocol used by the heterogeneous transmitter 204 of the computer device 20, and the heterogeneous transmission module 224 and the heterogeneous transmitter 204 have ability of transferring data each other. For example, the heterogeneous transmission module 224 uses the USB TYPE-C wired transmission protocol, the heterogeneous transmitter 204 uses USB 2.0 wired transmission protocol, USB 3.0 wired transmission protocol or USB TYPE-C wired transmission protocol. The output module 206 is used to output data. The control module 220 is used to control the output device 22.

In one embodiment, the computer device 20 is arranged the friendly human-machine interface 208 (such as a combination of complete keyboard and large-size display, large-size touch screen or the other maneuverable interface), so as to be more maneuverable than the output device 22. In another embodiment, the computer device 20 is a user-habitual device (such as the smartphone which user uses in peacetime).

Figure 3:
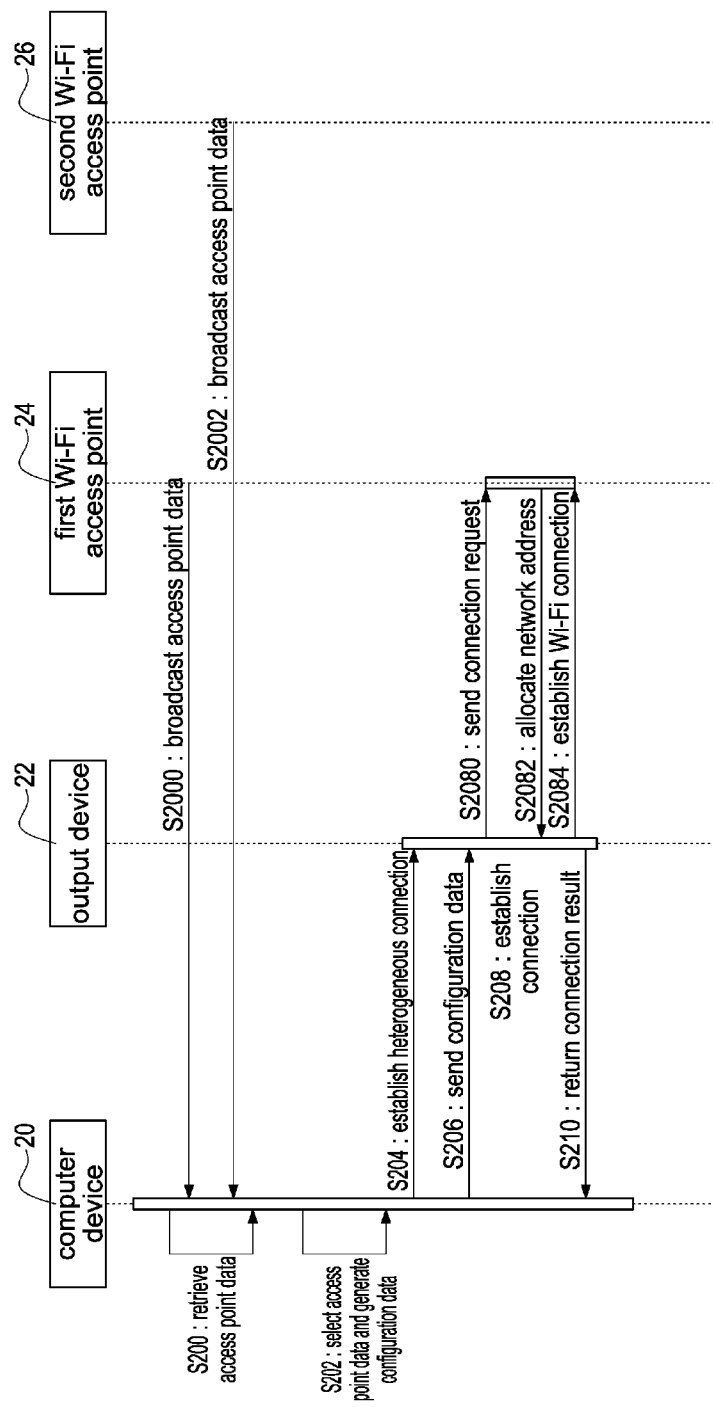
FIG. 3 is a sequence diagram of a method for quick configuration of Wi-Fi connection of output device according to the first embodiment of the present disclosed example.

Please refer to FIG. 3, which is a sequence diagram of a method for quick configuration of Wi-Fi connection of output device according to the first embodiment of the present disclosed example. The method for quick configuration of Wi-Fi connection of output device in each embodiment according to the present disclosed example is mainly implemented by the network system as illustrated in FIG. 2.

More specifically, the memory 206 of the computer device 20 comprises a non-transitory computer readable media which store a computer program (such as application program or the driver program of the output device 22). Above-mentioned computer program contains computer-executable program codes or machine codes. When the processor 200 of the computer device 200 executes the computer-executable program codes or the machine codes, the processor 200 may control the computer device 20 to interact with the other devices of the network system (such as the output device 22, the first Wi-Fi access point 2 and the second Wi-Fi access point 26), so as to perform each step of the method for quick configuration of Wi-Fi connection of output device in each embodiment according to the present disclosed example.

In the first, the computer device 20 receives the user's operation via the human-machine interface 208 for triggering the processor 200 to retrieve the access point data of a plurality of Wi-Fi access points (step S200). In one embodiment, above-mentioned access point data may comprise SSID of the corresponded Wi-Fi access point, hardware address (such as MAC address) of the corresponded Wi-Fi access point, device ID of the corresponded Wi-Fi access point or any combination of above data.

In one embodiment, the processor 200 may scan signals of Wi-Fi access points arranged around based on the Wi-Fi protocol for obtaining a scan result via Wi-Fi transmitter 202, wherein the scan result comprises a plurality of access point data. During scan, the computer device 20 may receive a first access point data broadcasted by the first Wi-Fi access point 24 (step S2000), and may receive a second access point data broadcasted by the second Wi-Fi access point 26 (step S2002). Furthermore, the user may move the computer device 20 to a region arranged the output device 22 before scan, so as to make sure the computer device 20 and the output device 22 are located in the signal range of the same Wi-Fi access point (such as above-mentioned first Wi-Fi access point 24 and above-mentioned second Wi-Fi access point 26).

In general, the capacity of a cache memory of the Wi-Fi transmitter 202 of the computer device 20 is larger than the capacity of a cache memory of the Wi-Fi module 222 of the output device 22. In other words, a number of the Wi-Fi access points which could be scanned and temporarily stored by the computer device 20 are larger than a number of the Wi-Fi access points which could be scanned and temporarily stored by the output device 22. Via replacing the output device 22 with the computer for scan the signals of the Wi-Fi access points arranged around, the present disclosed example can effectively reduce the probability of the designated Wi-Fi access point being excluded from the scan result caused by the capacity of the cache memory being insufficient from storing the access point data of the designated Wi-Fi access point, and reduce the probability of missing the designated Wi-Fi access, so as to make the scan result more accurate.

In one embodiment, the memory 206 further stores a plurality of access point data (such as third Wi-Fi access point data and fourth Wi-Fi access point data) of the Wi-Fi access points (such as third Wi-Fi access point and fourth Wi-Fi access point) having been connected by the computer device 20 previously. The processor 200 loads the plurality of access point data stored in advance from the memory 206.

Thus, even the Wi-Fi access point has been configured to be hidden (namely, the Wi-Fi access point will not broadcast its access point data), only if the computer device 20 had connected to the designated Wi-Fi access point is the present disclosed example has ability of obtaining the access point data of the designated Wi-Fi access point via the computer device 20 and making the output device 20 connect to the hidden Wi-Fi access point (described later).

In one embodiment, in the same time of the processor 200 scanning the signals of the Wi-Fi access points arranged around via Wi-Fi transmitter 202, the processor 200 may load above-mentioned pre-stored access point data from the memory 206, so as to search the connectable Wi-Fi access points as much as possible.

Then, the processor 200 selects one of a plurality of retrieved access point data (take selecting the first access point of the first Wi-Fi access point 24 for example in FIG. 3), and generates configuration data according to the selected access point data (step S202).

In one embodiment, the processor 200 generates the configuration data according to the selected access point data, the connection password (the connection password may be pre-stored in the memory 206 or received by user input real-time) corresponding to this access point, and/or the MAC address of the Wi-Fi transmitter 202.

In one embodiment, the processor 200 outputs a plurality of the retrieved access point data via the human-machine interface 208 (such as playing audio corresponding to the access point data via speaker or displaying words corresponding to the access point data via display) for the user viewing. Besides, the processor 200 receives the user's operation via the human-machine interface 208, and selects one of the pluralities of the access point data according to this operation.

In one embodiment, if the Wi-Fi transmitter 202 had connected to any Wi-Fi access point currently, the processor 200 may automatically select the access point data corresponding to the Wi-Fi access point connected by the computer device 20 currently.

Then, the processor 200 establishes a heterogeneous connection with heterogeneous transmission module 224 of the output device 22 based on a heterogeneous protocol via heterogeneous transmitter 204 (step S204).

For example, if the heterogeneous protocol is USB wire transmission protocol and both the heterogeneous transmitter 204 and the heterogeneous transmission module 224 are USB connector or connection port, the user may use an USB cable to make the heterogeneous transmitter 204 and the heterogeneous transmission module 224 be connected each other for establishing the USB connection (namely, heterogeneous connection). In the other example, if the heterogeneous protocol is NFC wireless transmission protocol and both the heterogeneous transmitter 204 and the heterogeneous transmission module 224 are NFC transmitter, the user may move the heterogeneous transmitter 204 in a sensing range of the heterogeneous transmission module 224 for establishing the NFC connection (namely, heterogeneous connection). In the other example, if the heterogeneous protocol is Bluetooth wireless transmission protocol and both the heterogeneous transmitter 204 and the heterogeneous transmission module 224 are Bluetooth transmitter, the user may operate the computer device 20 for establishing the Bluetooth connection (namely, heterogeneous connection) between the heterogeneous transmitter 204 and the heterogeneous transmission module 224.

Then, the processor 200 controls the heterogeneous transmitter 204 to send the generated configuration data to the heterogeneous transmission module 224 of the output device 22 via the established heterogeneous connection (step S206).

Then, the output device 22 establishes a Wi-Fi connection with the Wi-Fi access point (take first Wi-Fi access point for example) corresponding to the received configuration data according to the received configuration data (step S208). For clarity, above-mentioned Wi-Fi connection is referred to as the first Wi-Fi connection in following description.

More specifically, during establishing the first Wi-Fi connection, the control module 220 of the output device 22 recognizes the first Wi-Fi access point 24 corresponding to the configuration data, and controls the Wi-Fi module 222 to send a connection request to the recognized first Wi-Fi access point 24 based on the Wi-Fi protocol (step S2080). The first Wi-Fi access point 24 allocates a set of network address (such as IP address) to the output device 22 and returns the information related to the allocated network address to the output device 22 after receiving the connection request and determining that the connection request passes verification (step S2082). Finally, the output device 22 completes the establishment of the first Wi-Fi connection according to the received information (step S2084).

In one embodiment, the output device 22 may returns a connection result to the computer device 20 via the heterogeneous connection after completing the establishment of the first Wi-Fi connection (step S210).

In one embodiment, the output device 22 returns the connection result to the Wi-Fi transmitter 202 of the computer device 20 via the first Wi-Fi connection and the first Wi-Fi access point 24, so as to confirm whether the output device 22 has ability of transferring data with computer device 20 each other.

Figure 4:
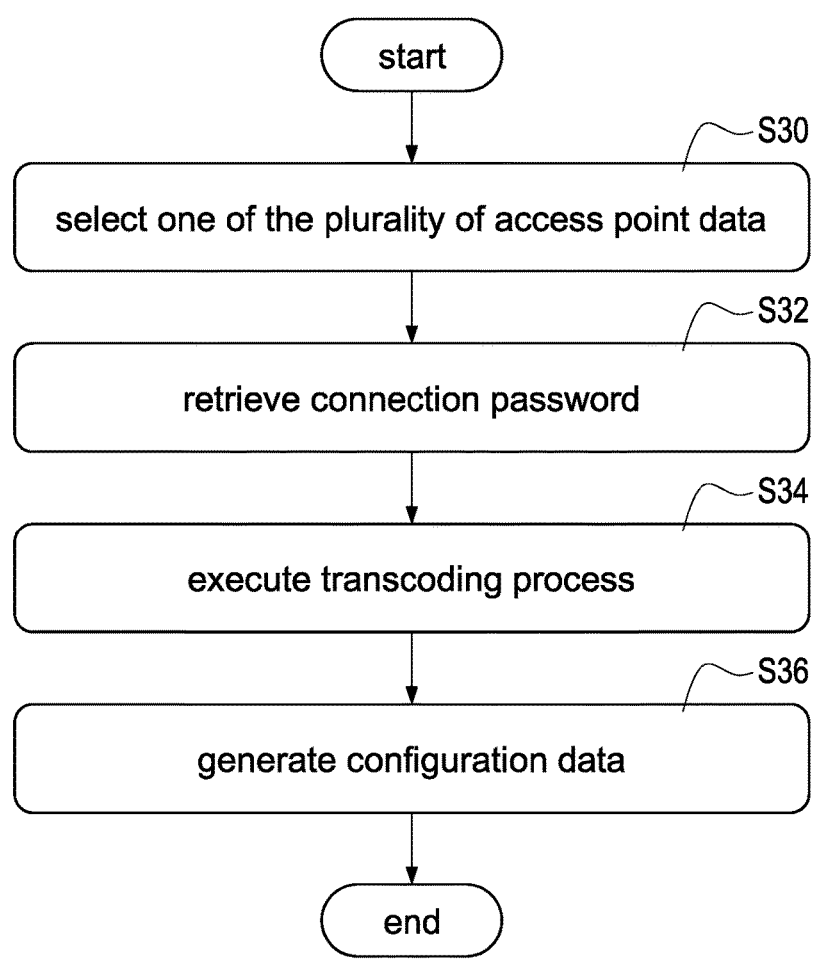
FIG. 4 is a part of sequence diagram of a method for quick configuration of Wi-Fi connection of output device according to the second embodiment of the present disclosed example.

Please refer to FIG. 4, which is a part of sequence diagram of a method for quick configuration of Wi-Fi connection of output device according to the second embodiment of the present disclosed example. FIG. 4 is used to further describe the step S202 of FIG. 3.

The processor 200 of the computer device 20 selects one of the plurality of retrieved access point data (step S30), and retrieves the connection password of the selected access point data (step S32). In one embodiment, the processor 200 is configured to select one of the pluralities of access point data obtained by scan, and instructs the user to input the connection password via the human-machine interface 208. In another embodiment, the processor 200 is configured to select one of the pluralities of pre-stored access point data, and loads the connection password used to connect to the access point corresponding to the selected access point data previously from the memory 206.

In one embodiment, the present disclosed example further provides a function of transcoding access point data. The function of transcoding access point data is configured to transform the access point data from a current coding format into another point data supported by the output device 22 (step S34). More specifically, although the SSID of the access point data may be exhibited by a set of special characters (such as Chinese characters or Japanese characters) other than English and numbers, the default coding format to the same type special characters may be different in the different devices. To prevent the output device 22 from an error caused by the output device 22 having not ability of supporting coding format used by the selected access point, the present disclosed example further transforms the coding format via above-mentioned function of transcoding access point data.

Take the access point data comprising Traditional Chinese characters for example, the computer device 20 may use the BIG 5 coding format as the default coding format, the output device 22 may use the UTF-8 coding format as the default coding format. In this situation, when the computer device 20 sends the access point data with the BIG 5 coding format to the output device 22, the output device 22 will cause a transcoding error (such as the transcoding result being garbled) because of using the UTF-8 coding format to transcode the access point data with the BIG 5 coding format. Thus, the present disclosed example can effectively prevent the problem of transcoding error via transforming the access point data from a current coding format into another point data supported by the output device 22 in advance.

Finally, the processor 200 generates the configuration data according to the processed access point data (or the selected access point data if the transcoding process is not executed) and the connection password (step S36). Because of the generated configuration data having comprised connection password and the connection-related information, the output device 22 may directly execute verification and establish a connection with the Wi-Fi access point without the user manually inputting the connection password in the output device 22 after receiving the configuration data.

Figure 5:
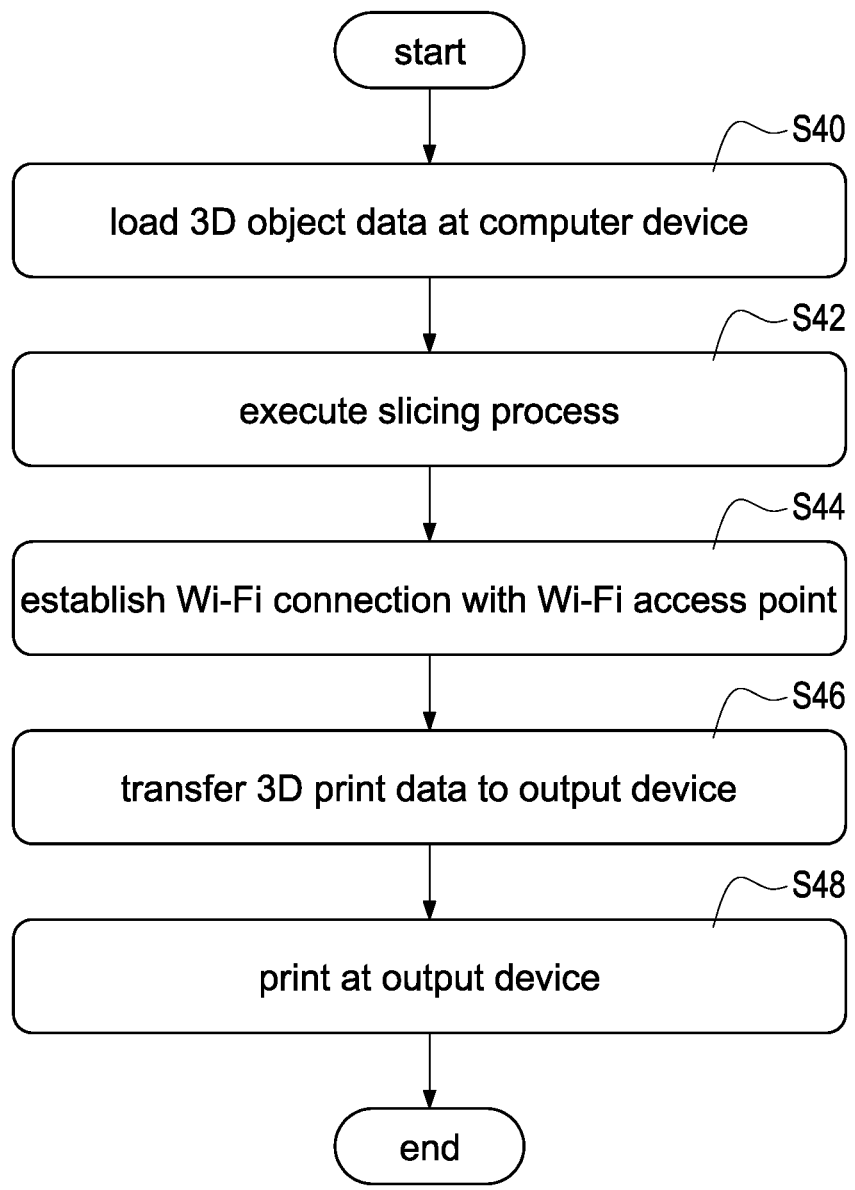
FIG. 5 is a part of sequence diagram of a method for quick configuration of Wi-Fi connection of output device according to the third embodiment of the present disclosed example.

Please refer to FIG. 5, which is a part of sequence diagram of a method for quick configuration of Wi-Fi connection of output device according to the third embodiment of the present disclosed example. In this embodiment, the output device 22 is a 3D printer; the output module 226 is a 3D print module and comprises one or more 3D print head(s). The memory 206 of the computer device 20 further stores a 3D object data and a slicing program. This embodiment further explains the FIG. 3.

After the step S208 of the FIG. 3 (namely, the output device 22 had established the first Wi-Fi connection with the first Wi-Fi access point 24), the processor 200 of the computer device 20 loads the 3D object data from the memory 206 (step S40), and executes the slicing program to execute a slicing process to the loaded 3D object data for generating a 3D print data (step S42).

Then, the processor 200 controls the Wi-Fi transmitter 202 to establish a second Wi-Fi connection with the Wi-Fi access point (the first Wi-Fi access point 24 in this example) corresponding to above-mentioned configuration data based on the Wi-Fi protocol (step S44). After completing to perform the step S44, the computer device 20 will be added to the first Wi-Fi local area network 240 establishing by the first Wi-Fi access point 24 via the second Wi-Fi connection, so as to have ability of transferring data with the output device 22 each other.

After the second Wi-Fi connection had been established, the processor 200 sends the 3D print data to the Wi-Fi module 222 of the output device 22 via the first local area network 240 (step S46). More specifically, the processor 200 controls the Wi-Fi transmitter 202 to send the 3D print data to the output device 22 via the second Wi-Fi connection, the first Wi-Fi access point 24 and the first Wi-Fi connection.

Then, the control module 220 controls the 3D print head(s) of the output module 226 to print layer by layer for generating a 3D physical model according to the 3D print data received by the Wi-Fi module 222 (step S48).

In one embodiment, above-mentioned 3D print data comprises a plurality of path files corresponding to a plurality of object slices and/or a plurality of 2D color images corresponding to a plurality of object slices. The control module 220 controls the 3D print head(s) to print each object slice orderly according to each path file and/or each 2D color image, so as to make the printed object slices are stacked as the 3D physical models.

Thus, the present disclosed example can effectively transfer data to the output device via the established Wi-Fi connection, so as to output above-mentioned data by the output module of the output device.

The above mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A method for quick configuration of Wi-Fi connection of output device, comprising:
  a) retrieving a plurality of access point data respectively corresponding to a plurality of Wi-Fi access points based on a Wi-Fi protocol at a computer device;
  b) selecting one of the pluralities of the access point data;
  c) executing a transcoding process to the selected access point data for transforming the access point data from a first coding format into a second coding format supported by the output device;
  d) generating configuration data according to the transcoded access point data;
  e) establishing a heterogeneous connection with the output device based on a heterogeneous protocol, wherein the heterogeneous protocol is different from the Wi-Fi protocol;
  f) transmitting the configuration data to the output device via the heterogeneous connection; and
  g) establishing a first Wi-Fi connection with the corresponding Wi-Fi access point based on the Wi-Fi protocol according to the transmitted configuration data at the output device;
  wherein each access point data comprises an SSID corresponding to the Wi-Fi access point.

2. The method for quick configuration of Wi-Fi connection of output device according to claim 1, wherein the step a) is configured to scan the plurality of the access point data respectively broadcasted by the plurality of the Wi-Fi access points based on the Wi-Fi protocol.

3. The method for quick configuration of Wi-Fi connection of output device according to claim 1, further comprising a step of
  retrieving a connection password of the selected access point data before the step d) and after the step b);
  wherein the step d) is configured to generate the configuration data according to the transcoded access point data and the connection password.

4. The method for quick configuration of Wi-Fi connection of output device according to claim 1, wherein the heterogeneous protocol is USB wire transmission protocol, NFC wireless transmission protocol or Bluetooth wireless transmission protocol.

5. The method for quick configuration of Wi-Fi connection of output device according to claim 1, wherein the step a) is configured to load the plurality of the access point data of the plurality of the Wi-Fi access points which the output device had connected previously.

6. The method for quick configuration of Wi-Fi connection of output device according to claim 1, wherein the step b) is configured to select the access point data of the Wi-Fi access point which the computer device connects currently.

7. The method for quick configuration of Wi-Fi connection of output device according to claim 1, wherein the step g) comprises following steps of:
  g1) sending a connection request to the corresponding Wi-Fi access point based on the Wi-Fi protocol according to the received configuration data;
  g2) receiving a network address from the Wi-Fi access point; and
  g3) establishing a first Wi-Fi connection with the Wi-Fi access point according to the network address.

8. The method for quick configuration of Wi-Fi connection of output device according to claim 1, wherein the output device is a 3D printer, the method for quick configuration of Wi-Fi connection of output device comprises following steps of:
  i1) loading 3D object data at the computer device;
  i2) executing a slicing process to the 3D object data for generating a 3D print data;
  i3) establishing a second Wi-Fi connection with the corresponding Wi-Fi access point based on the Wi-Fi protocol according to the configuration data;
  i4) transferring the 3D print data to the output device via the second Wi-Fi connection, the corresponded Wi-Fi access point data and the first Wi-Fi connection; and
  i5) controlling a 3D print head to print layer by layer for generating a 3D physical model according to the received 3D print data at the output device.

* * * * *